N. T. NELSON.
FRUIT BOX PRESS.
APPLICATION FILED FEB. 26, 1909.
933,660.
Patented Sept. 7, 1909.
2 SHEETS—SHEET 1.
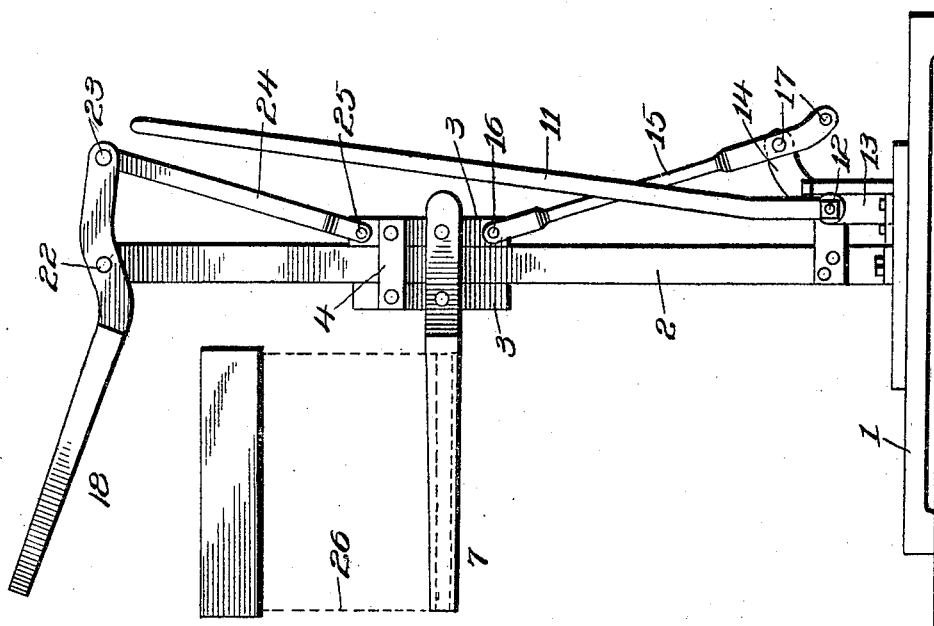
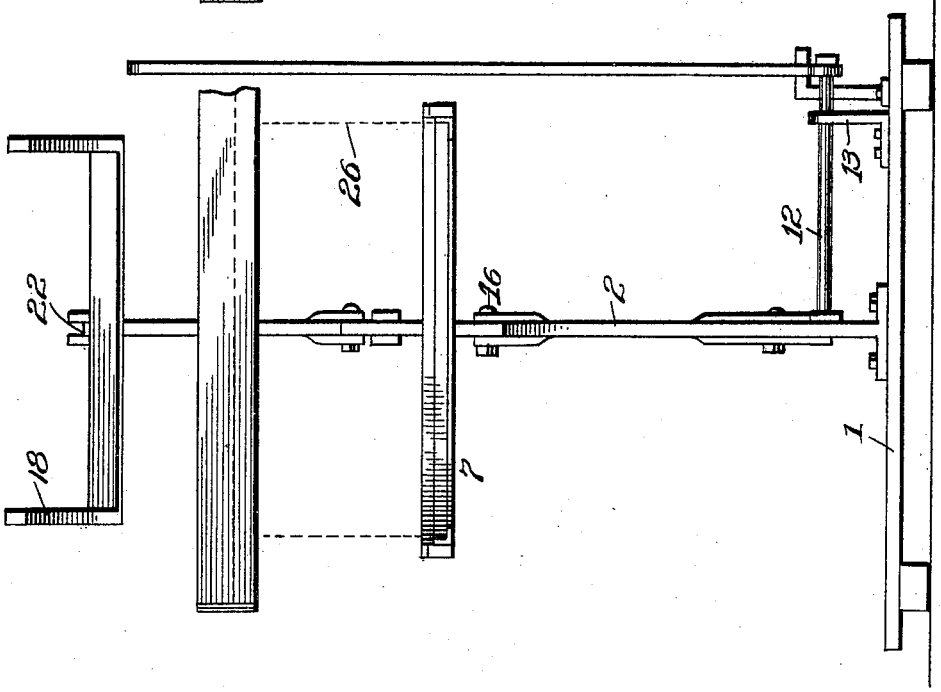
Witnesses
Geo. Ackman Jr.
R. M. Smith.
Inventor
Nels T. Nelson,
By Victor J. Evans
Attorney N. T. NELSON.
FRUIT BOX PRESS.
APPLICATION FILED FEB. 26, 1909.
933,660.
Patented Sept. 7, 1909.
2 SHEETS—SHEET 2.
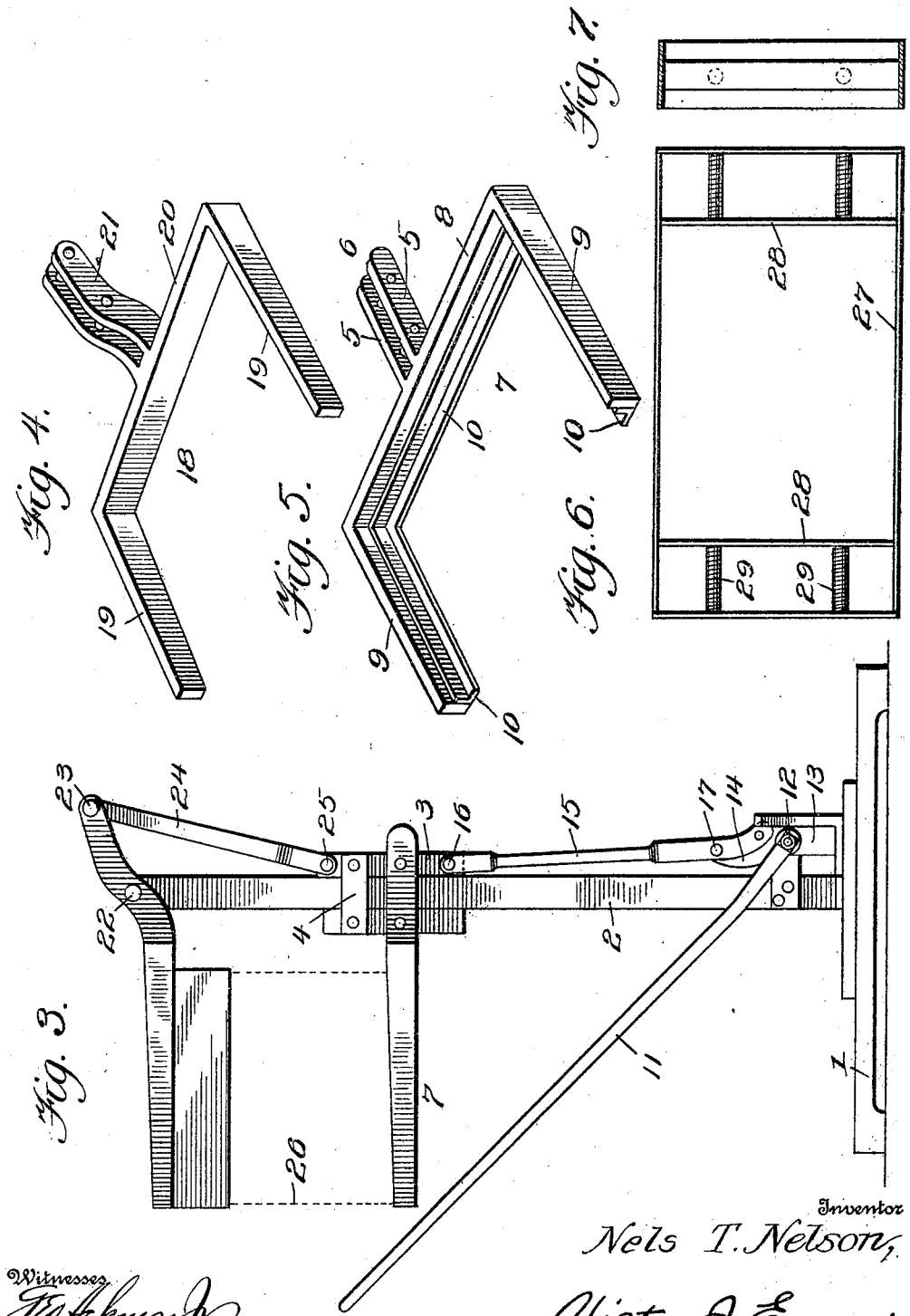
Witnesses
Inventor
Nels T. Nelson,
By Victor J. Evans
Attorney

UNITED STATES PATENT OFFICE.

NELS T. NELSON, OF GRAND JUNCTION, COLORADO.

FRUIT-BOX PRESS.

933,660.　　　　　　Specification of Letters Patent.　　Patented Sept. 7, 1909.

Application filed February 26, 1909. Serial No. 480,088.

*To all whom it may concern:*

Be it known that I, NELS T. NELSON, a citizen of the United States, residing at Grand Junction, in the county of Mesa and State of Colorado, have invented new and useful Improvements in Fruit-Box Presses, of which the following is a specification.

This invention relates to fruit box presses, the object of the invention being to provide a simple, practical and effective machine for applying the covers or tops of boxes with the required pressure to compress the fruit entirely within the lines or confines of the box and the cover.

With the above and other objects in view, the nature of which will more fully appear as the description proceeds, the invention consists in the novel construction, combination and arrangement of parts herein fully described, illustrated and claimed.

In the accompanying drawings: Figure 1 is a front elevation of a fruit box press embodying the present invention. Fig. 2 is a side elevation of the same showing the box support lowered and the compressing member elevated. Fig. 3 is a similar view showing the final position of the parts. Fig. 4 is a detail perspective view of the upper pressing member. Fig. 5 is a similar view of the lower box supporting member. Fig. 6 is a plan view of the cover guide. Fig. 7 is a cross sectional view of the same.

The box press comprises a base 1 from which extends upward a post or standard 2. Mounted to slide up and down on the standard 2 is a runner consisting of a pair of slides 3 bearing against opposite sides of the bar or standard 2 and connected by oppositely arranged yoke pieces 4 which hold the slides 3 at the proper distance apart to enable them to slide freely up and down on the standard 2. These slides 3 are further connected by the arms or blades 5 of a fork 6 extending rearwardly from a movable box support 7. The box support 7 is in the form of a three-sided frame comprising the main body or connecting bar 8 and the parallel bars 9 which extend perpendicularly to the bar 8 and are preferably formed integral therewith. The several bars 8 and 9 are rabbeted along their inner faces as shown in Fig. 5 and this may be accomplished in an easy and effective manner by securing to the inner faces of said bars 8 and 9, an angle bar 10, the latter forming a three-sided receptacle or seat for a fruit box as indicated by dotted lines in Figs. 1, 2 and 3.

The runner and the movable box support 7 carried by the runner, are movable up and down on the standard 2 by means of a hand operating lever 11 which is fulcrumed at 12 on a bracket 13 mounted on the base 1. The lever 11 is provided with a lever arm 14 to which is pivotally connected a link 15, the latter being pivotally connected at its upper end as shown at 16 to one of the slides 3 of the runner. The lower end of the link 15 is extended to provide for several holes 17 for the reception of the pivot pin which connects said link to the lever arm 14, thereby rendering it practical to vary the limits of up and down movement of the box support 7 to agree with the height of the box being operated upon.

Operating above the box is a compressing member 18 shown in detail in Fig. 4, and like the box support 7 consisting of a three sided frame, 19 designating the opposite parallel bars of the frame, and 20 representing the connecting bar or body thereof. Extending backward from the bar 20 is a forked lever arm 21 which is fulcrumed at 22 on the top of the standard 2, while connected by a pivot 23 to the rear extremity of the lever arm 21 is a link 24 which extends downward and is connected pivotally at 25 to one of the slides 3 of the runner. It will now be seen that as the runner is pushed upward by the operation of the lever 11, the movable box support is correspondingly moved upward and the compressing member 18 is swung downward so as to press the cover on the box carried by the movable support 7. The box is indicated by dotted lines at 26.

In Figs. 6 and 7 I have shown a box cover guide consisting of a rectangular frame 27 within which is arranged a pair of parallel presser bars 28 held yieldingly inward by means of springs 29 which are interposed between the presser bars 28 and the end bars of the frame 27. These presser bars are adapted to frictionally engage the opposite edges of the box cover (not shown) and sustain said cover in position in the guide frame 27 so as to enable the cover to be placed over the box and also to enable the box to be filled with fruit until the fruit extends above the top edge of the box. When the cover is placed on the box, it rests on the fruit and the guide which grasps the cover also engages the opposite sides of the box and guides the cover into proper position relatively to the top of the box as said guide together with the cover carried thereby is pressed downward by the action of the upper pressing member 18.

When the cover has been pressed upon the box by the machine hereinabove described and said cover has been secured in place on the box, the box with its applied cover, together with the guide frame 27 may be slid forward out of engagement with the box support 7 and the guide 27 may then be removed, which completes the operation.

I claim:

1. A fruit box press comprising a supporting base, a standard thereon, a runner movable lengthwise of said standard, a box support carried by said runner, a compressing member operating above the box support, and means for simultaneously moving the box support and compressing member toward each other.

2. A fruit box press comprising a movable box support, a movable box cover pressing member, and a lever controlled connection for effecting a simultaneous movement of said support and member toward each other.

3. A fruit box press comprising a standard, a movable box support slidable thereon, a box cover pressing member fulcrumed on said standard, an operating lever, and connections between said operating member and the box support and cover pressing member, whereby said support and pressing member are simultaneously moved in opposite directions.

4. A fruit box press comprising a standard, a runner movable up and down on said standard, a box support carried by said runner, a compressing member fulcrumed on said standard and operatively connected with said runner, and an operating lever operatively connected with said runner, whereby the operation of said lever effects a simultaneous movement of the box support and the compressing member toward and away from each other.

5. In a fruit box press, the combination of a movable box support, a compressing member, means for simultaneously moving the box support and the compressing member toward and away from each other, and a box cover guide embodying a frame adapted to embrace the box, and presser bars adapted to frictionally sustain the box cover.

6. In a fruit box press, the combination of a movable box support, a movable compressing member, lever operated connections for moving said box support and compressing member toward and away from each other, and a box cover guide embodying a rectangular frame adapted to embrace the top edge of a box, and spring pressed bars adapted to frictionally engage the box cover and sustain the same in proper relation to the box as the cover is pressed upon the box, substantially as described.

In testimony whereof I affix my signature in presence of two witnesses.

NELS T. NELSON.

Witnesses:
V. M. PUGH,
GEORGE W. FLETCHER.